(12) United States Patent
Park et al.

(10) Patent No.: US 12,373,362 B2
(45) Date of Patent: Jul. 29, 2025

(54) SEMICONDUCTOR DEVICE AND METHOD OF BUILDING A POOLED MEMORY WITHOUT USING SWITCHES

(71) Applicant: Primemas Inc., New York, NY (US)

(72) Inventors: Il Park, Seoul (KR); Jaegeun Yun, Seongnam-si (KR); Jinsu Park, Hwaseong-si (KR)

(73) Assignee: Primemas Inc., New York, NY (US)

( * ) Notice: Subject to any disclaimer, the term of this patent is extended or adjusted under 35 U.S.C. 154(b) by 1 day.

(21) Appl. No.: 18/602,229

(22) Filed: Mar. 12, 2024

(65) Prior Publication Data

US 2025/0045213 A1 Feb. 6, 2025

Related U.S. Application Data

(60) Provisional application No. 63/530,086, filed on Aug. 1, 2023.

(51) Int. Cl.
  *G06F 13/16* (2006.01)
  *G06F 13/42* (2006.01)
(52) U.S. Cl.
  CPC ...... *G06F 13/1657* (2013.01); *G06F 13/1631* (2013.01); *G06F 13/4221* (2013.01)
(58) Field of Classification Search
  None
  See application file for complete search history.

(56) References Cited

U.S. PATENT DOCUMENTS

| | | | | |
|---|---|---|---|---|
| 8,452,943 B2* | 5/2013 | Kobori | ................ | G06F 15/8046 711/4 |
| 9,110,778 B2* | 8/2015 | Fleischer | ................ | G06F 12/06 |
| 10,606,759 B2* | 3/2020 | Kraemer | ............... | G06F 3/0611 |
| 10,740,265 B1* | 8/2020 | Xu | ...................... | G06F 13/4221 |
| 11,687,251 B2* | 6/2023 | Greathouse | ........... | G06F 3/0619 711/154 |
| 11,841,800 B2* | 12/2023 | Beard | ................... | G06F 12/109 |

* cited by examiner

*Primary Examiner* — Elias Mamo
(74) *Attorney, Agent, or Firm* — Dinsmore & Shohl LLP; Yongsok Choi, Esq.

(57) ABSTRACT

A semiconductor device includes a first processor configured to generate a first memory physical address and a first memory request; a second processor configured to generate a second memory physical address and a second memory request; a first system-on-chip physically connected to the first processor and configured to convert the first memory physical address into a first device address; a second system-on-chip physically connected to the second processor and the first system-on-chip and configured to convert the second memory physical address into a second device address; and a first memory and a second memory respectively and physically connected to the first system-on-chip and the second system-on-chip. The first system-on-chip and the second system-on-chip respectively forward the first memory request and the second memory request to one of a plurality of memories including the first memory and the second memory according to the first device address and the second device address.

11 Claims, 22 Drawing Sheets

SEMICONDUCTOR DEVICE AND METHOD OF BUILDING A POOLED MEMORY WITHOUT USING SWITCHES

CROSS-REFERENCE TO RELATED APPLICATION

This application claims the benefit of U.S. Provisional Application No. 63/530,086 filed on Aug. 1, 2023, the entire contents of which are herein incorporated by reference.

BACKGROUND

1. Field

The present disclosure relates to a semiconductor device and a method of building a pooled memory without using switches between processors and memory modules. Particularly, the present disclosure relates to a memory controller System on Chip (SoC) device using a chiplet architecture and a method of distributing memory requests from hosts to relevant SoCs.

2. Description of the Related Art

Over the past decades, the memory wall has been one of the biggest performance barriers to the computer system engineers. Since we are approaching to the end of Moore's law, we do not expect that technology will alleviate the memory wall problem any time soon. New super applications including artificial intelligence, machine learning, and genomics analysis demand huge memory capacity. Therefore, the recent trend with these new applications puts extreme extra burden onto the current computer system.

Compute express Link (CXL)-interfaced memory solution is expected to be a solution for this memory wall problem. Under the Non-Uniform Memory Access (NUMA), the host processor will access the CXL-interfaced memory as a slow memory, while the host will access the DDR memory as a fast memory.

One of the important applications with the CXL-interfaced memory is the memory pooling or pooled memory, where multiple processors can access and share multiple CXL-interfaced memory modules. The current approach to build a pooled memory is to put a CXL switch between processors and CXL memory modules, as shown in the left side of FIG. 1. However, this approach brings three issues to the computer system: (1) extra latency (2) extra power consumption, and (3) extra cost. Among three, the extra latency caused by the CXL switch is the most critical issue to the system designer.

In this disclosure, we propose a mechanism to build a pooled memory without using any switch between processors and memory modules.

SUMMARY

The present disclosure provides a mechanism to build a pooled memory without using a switch between processors and memory modules.

The present disclosure consists of multiple System-on-Chip (SoC) devices and memory modules. Each SoC has directly attached memory modules. Each SoC can be connected to other SoCs through die-to-die interfaces or chip-to-chip interfaces.

A host processor sends a memory request to a SoC. The receiving SoC extract the destination information from the memory request. Based on the destination, the target memory module and its control SoC are determined.

Each SoC provides a method of forwarding a memory request to another SoC through die-to-die interfaces or chip-to-chip interfaces, when the SoC is not the target for the memory request.

Objects of the present disclosure are not limited to the objects described above, and other objects and advantages of the present disclosure that are not described may be understood by following descriptions and will be more clearly understood by examples of the present disclosure. Also, it will be apparent that objects and advantages of the present disclosure may be realized by devices and combinations thereof indicated in patent claims.

A system-on-chip device of the present disclosure may reduce delay time between a processor and a memory device by using a chiplet structure.

In addition, the chiplet structure allows free expansion and a combination of a processor and a memory device, and thereby, efficiency of all devices is increased.

According to some aspects of the disclosure, a semiconductor device includes; a first processor configured to generate a first memory physical address and a first memory request; a second processor configured to generate a second memory physical address and a second memory request, a first system-on-chip physically connected to the first processor and configured to convert the first memory physical address into a first device address, a second system-on-chip physically connected to the second processor and the first system-on-chip and configured to convert the second memory physical address into a second device address, and a first memory and a second memory respectively and physically connected to the first system-on-chip and the second system-on-chip, wherein the first system-on-chip and the second system-on-chip respectively forward the first memory request and the second memory request to one of a plurality of memories including the first memory and the second memory according to the first device address and the second device address.

According to some aspects, the first system-on-chip includes: a first MMU (memory management unit) configured to convert the first memory physical address into the first device address; and a router configured to determine whether the first device address corresponds to the first memory and configured to forward the first memory request to one of the first memory and the second system-on-chip.

According to some aspects, the first system-on-chip and the second system-on-chip control the plurality of memories according to a compute express link (CXL) protocol.

According to some aspects, the first memory has a device address in a first range, the second memory has a device address in a second range that is greater than the first range, and the router compares the first device address with the first range and forwards the first memory request.

According to some aspects, the first range is defined from a start address to an end address, and the router forwards the first memory request to the second system-on-chip when the first device address is greater than the end address.

According to some aspects, further comprising: a third processor configured to generate a third memory physical address and a third memory request; and a third system-on-chip physically connected to the third processor, the first system-on-chip, and the second system-on-chip and configured to convert the third memory physical address into a third device address.

According to some aspects, the router forwards the first memory request to an optimal path on which contour numbers are defied in order of proximity to a current system-on-chip.

According to some aspects, the first and second system-on-chip connect through die-to-die interfaces or chip-to-chip interfaces.

According to some aspects of the disclosure, A method of forwarding a memory request of a semiconductor device, the method comprising: receiving, by a first processor, a first memory request and a first physical address to which the first memory request has to be forwarded, converting the first physical address into a first device address by a first system-on-chip physically connected to the first processor, comparing, by the first system-on-chip, the first device address with a device address of a first memory connected to the first system-on-chip, forwarding the first memory request to the first memory when the first system-on-chip corresponds to the device address of the first memory, forwarding the first memory request to a second system-on-chip connected to the first system-on-chip when the first system-on-chip does not correspond to the device address of the first memory, comparing, by the second system-on-chip, the first device address with a device address of a second memory connected to the second system-on-chip, forwarding the first memory request to the second memory when the second system-on-chip corresponds to the device address of the second memory; and forwarding the first memory request to a third system-on-chip connected to the second system-on-chip when the second system-on-chip does not correspond to the device address of the second memory.

According to some aspects, the device address of the first memory is defined as a first range, and the comparing of the first device address with the device address of the first memory includes comparing a smallest value of the first range with the first device address, and comparing a greatest value of the first range with the first device address.

According to some aspects, a path between the first system-on-chip and the third system-on-chip is an optimal path.

Aspects of the disclosure are not limited to those mentioned above and other objects and advantages of the disclosure that have not been mentioned can be understood by the following description and will be more clearly understood according to embodiments of the disclosure. In addition, it will be readily understood that the objects and advantages of the disclosure can be realized by the means and combinations thereof set forth in the claims.

In addition to the above descriptions, detailed effects of the present disclosure are described below while describing details for implementing the present disclosure.

DETAILED DESCRIPTION

Figure 1:
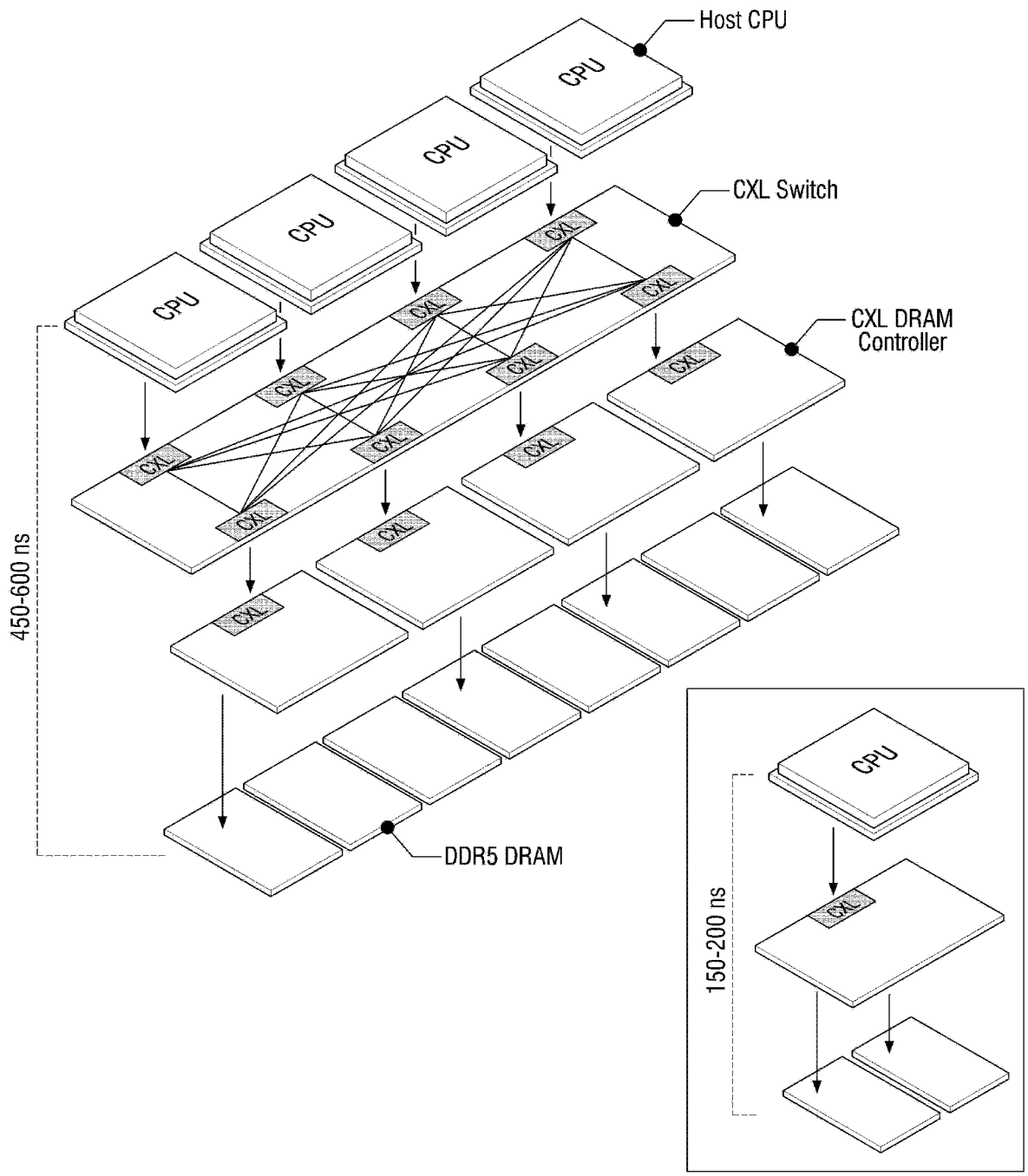
FIG. 1 is a conceptual diagram illustrating a semiconductor device according to some embodiments of the conventional disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own inventive concept in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are only used to differentiate one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular forms are intended to include plural forms unless the context clearly indicates otherwise. In the application, terms such as "comprise," "comprise," "have," etc. should be understood as not precluding the possibility of existence or addition of features, numbers, steps, operations, components, parts, or combinations thereof described herein.

Unless otherwise defined, the phrases "A, B, or C," "at least one of A, B, or C," or "at least one of A, B, and C" may refer to only A, only B, only C, both A and B, both A and C, both B and C, all of A, B, and C, or any combination thereof.

Unless being defined otherwise, all terms used herein, including technical or scientific terms, have the same meaning as commonly understood by those skilled in the art to which the disclosure pertains.

Terms such as those defined in commonly used dictionaries should be construed as having a meaning consistent with the meaning in the context of the relevant art, and are not to be construed in an ideal or excessively formal sense unless explicitly defined in the application. In addition, each configuration, procedure, process, method, or the like included in each embodiment of the disclosure may be shared to the extent that they are not technically contradictory to each other.

Hereinafter, a semiconductor device according to some embodiments of the present disclosure will be described with reference to FIGS. 2 to 22.

Figure 2:
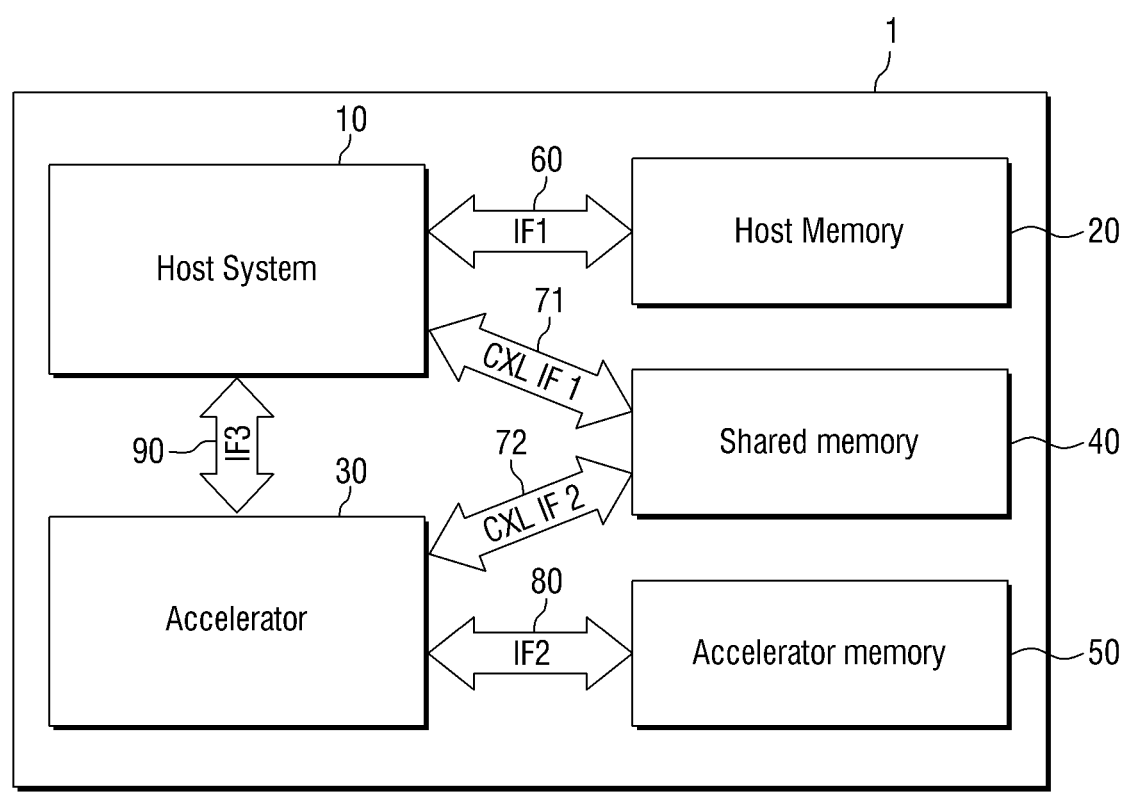
FIG. 2 is a block diagram illustrating a semiconductor device according to some embodiments of the present disclosure.

FIG. 2 is a block diagram illustrating a semiconductor device according to some embodiments of the present disclosure.

Referring to FIG. 2, a semiconductor device 1 according to some embodiments of the present disclosure may include a host system 10, a host memory 20, an accelerator 30, a shared memory 40, and an accelerator memory 50, a first interface 60, a first compute express link (CXL) interface 71, a second CXL interface 72, a second interface 80, and a third interface 90.

The system-on-a-chip device 1 may be a computer or an electronic system component integrated into a single integrated circuit. In other words, the system-on-a-chip device 1 may be a device in which multiple devices having multiple functions are integrated into a single chip.

The host system 10 may be a control device that controls the semiconductor device 1 and performs program operations. The host system 10 is a general-purpose computing device and may have relatively low efficiency for performing parallel simple operations commonly used in deep learning or graphics processing. Accordingly, the separate accelerator 30 may intensively perform deep learning inference, learning tasks, and graphics processing operations, and accordingly, the semiconductor device 1 may have high efficiency.

The host system 10 may exchange data and signals with the host memory 20 through the first interface 60. Also, the host system 10 may exchange data and signals with the shared memory 40 through the first CXL interface 71. The host system 10 may transmit data and signals to the accelerator 30 through the third interface 90.

The host system 10 may be, for example, a central processing unit (CPU) of the semiconductor device 1. The host system 10 may instruct the accelerator 30 to process a certain task and receive a report on the processing result.

The host memory 20 may be a dedicated memory of the host system 10. That is, the host memory 20 may communicate with the host system 10 and store data of the host system 10.

The host memory 20 may continuously maintain the stored information even when power is not supplied to the host memory 20. The host memory 20 may include at least one of, for example, read-only memory (ROM), programmable read-only memory (PROM), erasable alterable ROM (EAROM), erasable programmable read-only memory (EPROM), electrically erasable programmable read-only memory (EEPROM) (for example, NAND flash memory or NOR flash memory), ultra-violet erasable programmable read-only memory (UVEPROM), ferroelectric random access memory (FeRAM), magnetoresistive random access memory (MRAM), phase-change random access memory (PRAM), silicon-oxide-nitride-oxide-silicon (SONOS), resistive random access memory (RRAM), nanotube random access memory (NRAM), a magnetic computer memory device (for example, a hard disk, a diskette drive, or a magnetic tape), an optical disk drive, and three dimensional (3D) XPoint memory. However, the embodiment is not limited thereto.

The accelerator 30 may perform complex graphics processing or perform calculations by using an artificial neural network. The accelerator 30 may be, for example, a graphics processing unit (GPU) that performs graphics processing or a neural processing unit (NPU) that performs deep learning calculation tasks. However, the embodiment is not limited thereto.

Alternatively, the accelerator 30 may be one of, for example, a field programmable gate array (FPGA) and an application-specific integrated circuit (ASIC). However, the embodiment is not limited thereto.

The accelerator 30 may exchange data and signals with the accelerator memory 50 through the second interface 80. Also, the accelerator 30 may exchange data and signals with the shared memory 40 through the second CXL interface 72. The accelerator 30 may transmit data and signals to the host system 10 through the third interface 90.

The shared memory 40 may be memory shared by the host system 10 and the accelerator 30. That is, the shared memory 40 may store and load data of the host system 10. Also, the shared memory 40 may store and load data of the accelerator 30. In other words, the shared memory 40 may function as a memory device of the host system 10 and may also function as a memory device of the accelerator 30.

The shared memory 40 may exchange data and signals with the host system 10 through the first CXL interface 71. The shared memory 40 may exchange data and signals with the accelerator 30 through the second CXL interface 72. In this case, the shared memory 40 may be CXL memory. The CXL memory is a next-generation interface used in a high-performance computing system and may increase the entire memory efficiency due to a large bandwidth and compatibility with a CPU, a GPU, and an NPU. In particular, the CXL memory may reduce system operating costs with high performance and low power consumption. In other words, by using the shared memory 40, the semiconductor device 1 may reduce system operating costs and ensure high memory efficiency.

Unlike the host memory 20, the shared memory 40 may be a volatile memory. Unlike non-volatile memory, the volatile memory may continuously require power to maintain the stored information. The volatile memory may include at least one of, for example, dynamic random access memory (DRAM), static random access memory (SRAM), synchronous dynamic random access memory (SDRAM), and double data rate SDRAM (DDR SDRAM). However, the embodiment is not limited thereto.

The accelerator memory 50 may be a dedicated memory of the accelerator 30. That is, the accelerator memory 50 may communicate with the accelerator 30 to store data of the accelerator 30.

The accelerator memory 50 may be a non-volatile memory that continuously maintain the stored information even when power is not supplied to the accelerator memory 50. The accelerator memory 50 may include at least one of, for example, read-only memory (ROM), programmable read-only memory (PROM), erasable alterable ROM (EAROM), erasable programmable read-only memory (EPROM), electrically erasable programmable read-only memory (EEPROM) (for example, NAND flash memory or NOR flash memory), ultra-violet erasable programmable read-only memory (UVEPROM), ferroelectric random access memory (FeRAM), magnetoresistive random access memory (MRAM), phase-change random access memory (PRAM), silicon-oxide-nitride-oxide-silicon (SONOS), resistive random access memory (RRAM), nanotube random access memory (NRAM), a magnetic computer memory device (for example, a hard disk, a diskette drive, or a magnetic tape), an optical disk drive, and three dimensional (3D) XPoint memory. However, the embodiment is not limited thereto.

The system-on-a-chip device 1 may include dedicated non-volatile memory for each of the host system 10 and the accelerator 30, that is, may include the host memory 20 and the accelerator memory 50. In addition to this, the semiconductor device 1 may also include dedicated volatile memory for each of the host system 10 and the accelerator 30, although not illustrated in the drawings. However, the embodiment is not limited thereto.

The first interface 60 may transmit data and signals between the host system 10 and the host memory 20. The second interface 80 may transmit data and signals between the accelerator 30 and the accelerator memory 50. The third interface 90 may transmit data and signals between the host system 10 and the accelerator 30.

The first interface 60 and the second interface 80 may each include at least one of, for example, parallel advanced technology attachment (PATA), small computer system interface (SCSI), serial attached SCSI (SAS), serial advanced technology attachment (SATA), and PCI express (PCIe). However, the embodiment is not limited thereto.

The first CXL interface 71 may transmit data and signals between the host system 10 and the shared memory 40. The second CXL interface 72 may transmit data and signals between the accelerator 30 and the shared memory 40. The first CXL interface 71 and the second CXL interface 72 may follow restrictions, such as CXL™ 3.0. The first CXL interface 71 and the second CXL interface 72 may provide a switch function such that respective devices, such as the host system 10 and the accelerator 30, may divide and use the shared memory 40.

In addition, the embodiment may also use at least one interface among single data rate (SDR), double data rate (DDR), quad data rate (QDR), and eXtreme data rate (XDR) instead of the first CXL interface 71 and the second CXL interface 72.

Figure 3:
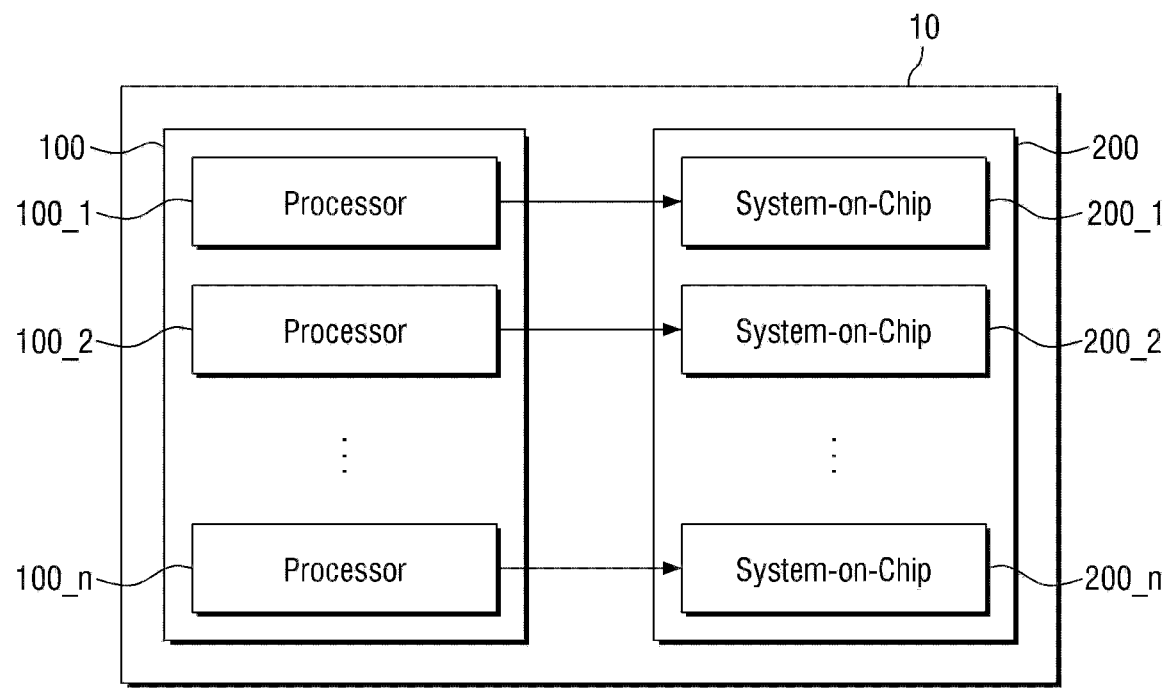
FIG. 3 is a block diagram illustrating the host system 10 of FIG. 2 in detail.

FIG. 3 is a block diagram illustrating the host system 10 of FIG. 2 in detail.

Referring to FIG. 3, the host system 10 may include at least one processor 100 and at least one system-on-chip 200.

The at least one processor 100 may include n processors, that is, a first processor 100_1, a second processor 100_2, and an n-th processor 100_n. In this case, n may be an integer of 1 or more.

The at least one system-on-chip 200 may include n system-on-chips, that is, a first system-on-chip 200_1, a second system-on-chip 200_2, and an n-th system-on-chip 200_n. That is, the number of system-on-chips 200 may be n which is equal to the number of processors 100. However, the embodiment is not limited thereto.

The processor 100 may be connected 1:1 to the system-on-chip 200. That is, one processor 100 may be connected to one system-on-chip 200. For example, the first processor 100_1 may be connected to the first system-on-chip 200_1, and the second processor 100_2 may be connected to the second system-on-chip 200_2. Likewise, the n-th processor 100_n may be connected to the n-th system-on-chip 200_n. However, the embodiment is not limited thereto.

Figure 4:
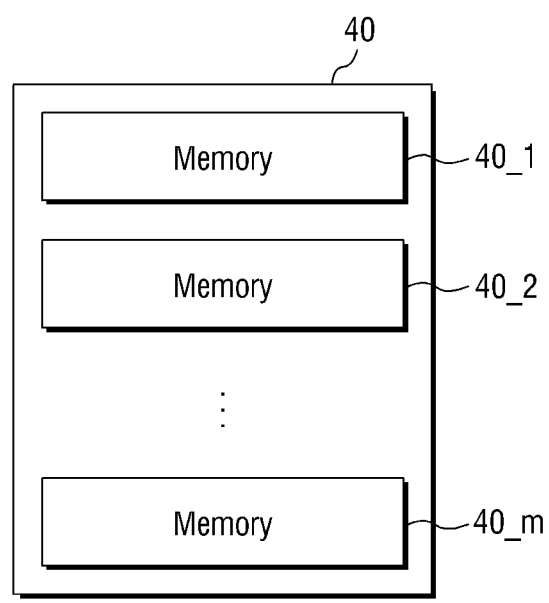
FIG. 4 is a block diagram illustrating the shared memory 40 of FIG. 2 in detail.

FIG. 4 is a block diagram illustrating the shared memory 40 of FIG. 2 in detail.

Referring to FIG. 4, the shared memory 40 may include at least one memory. Specifically, the shared memory 40 may include a first memory 40_1, a second memory 40_2, and an m-th memory 40_m. In this case, m may be an integer of 1 or more. Here, m may be greater than n, but the present embodiment is not limited thereto.

The first memory 40_1 to the m-th memory 40_m may be defined as, for example, memory banks of the shared memory 40. Alternatively, the first memory 40_1 to the m-th memory 40_m may be virtual unit memories in which internal regions of the shared memory 40 are distributed evenly or unevenly.

Figure 5:
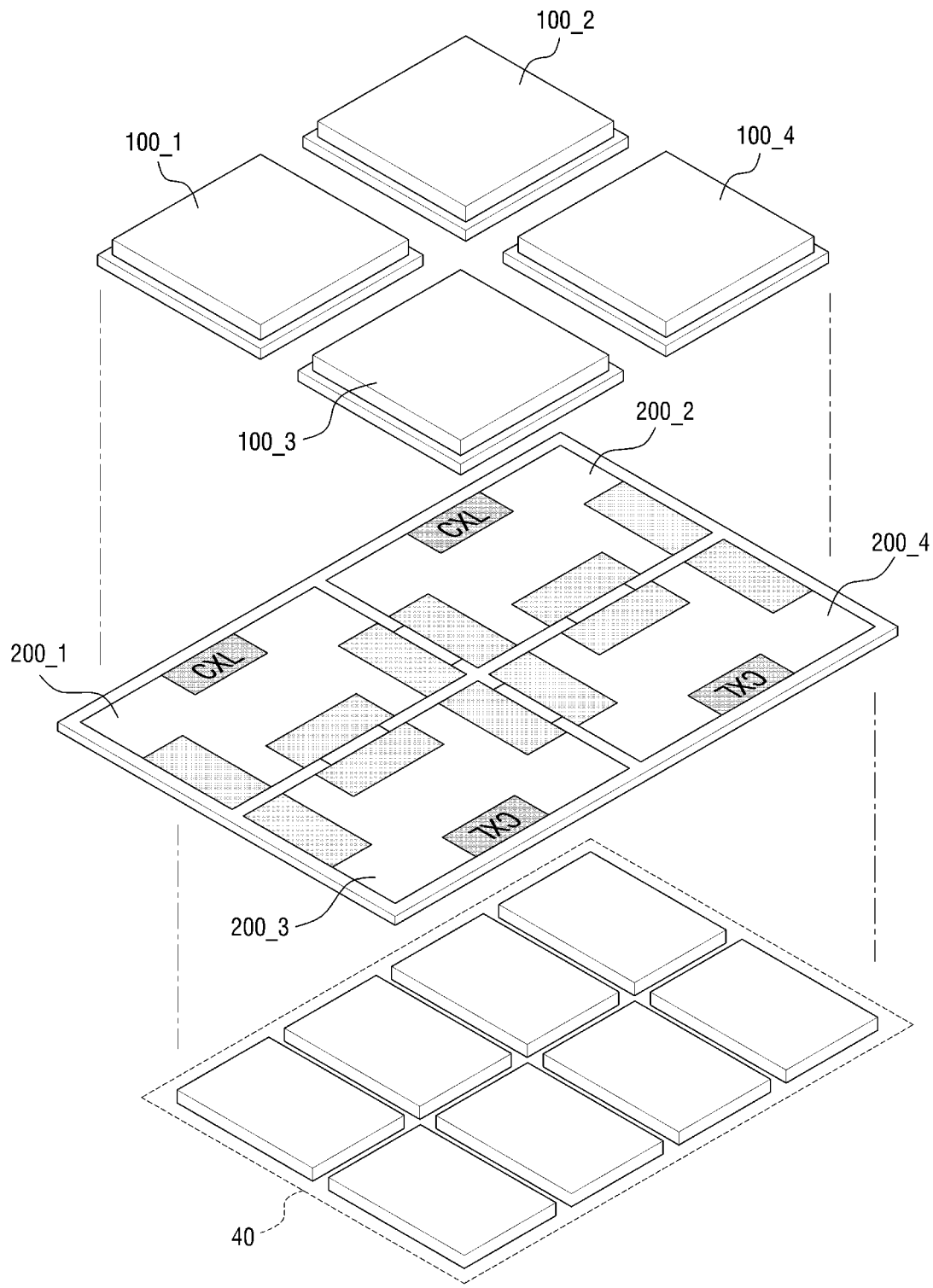
FIG. 5 is a conceptual diagram illustrating a combined structure of a processor, a system-on-chip, and a shared memory of a semiconductor device according to some embodiments of the present disclosure.

FIG. 5 is a conceptual diagram illustrating a combined structure of a processor, a system-on-chip, and a shared memory of a semiconductor device according to some embodiments of the present disclosure.

Referring to FIG. 5, the first to fourth processors 100_1 to 100_4 may be respectively and physically connected to the first to fourth system-on-chips 200_1 to 200_4. The first to fourth processors 100_1 to 100_4 may be respectively and physically connected to the first to fourth system-on-chips 200_1 to 200_4. That is, the first to fourth system-on-chips (200_1 to 200_4) may each internally connect modules (a processor, a memory, and so on) having different functions to each other and also connect different system-on-chips to each other, thereby being able to implement a diverse and highly scalable connection structure.

The first to fourth system-on-chips 200_1 to 200_4 may be connected to each other die to die (D2D). That is, the first to fourth system-on-chips 200_1 to 200_4 may quickly exchange data with each other through ports of the respective system-on-chips.

The shared memory 40 may also be physically connected to the first to fourth system-on-chips 200_1 to 200_4. The shared memory 40 may be connected to the ports of the first to fourth system-on-chips 200_1 to 200_4, and accordingly, the shared memory 40, the first to fourth system-on-chips 200_1 to 200_4, and the first to fourth processors 100_1 to 100_4 may be connected to each other through the first to fourth system-on-chips (200_1 to 200_4). However, the embodiment is not limited thereto.

Although four processors and four system-on-chips are illustrated in the drawings, this is only an example, and the embodiment is not limited thereto. That is, in the embodiment, the number of processors and system-on-chips may be changed.

Figure 6:
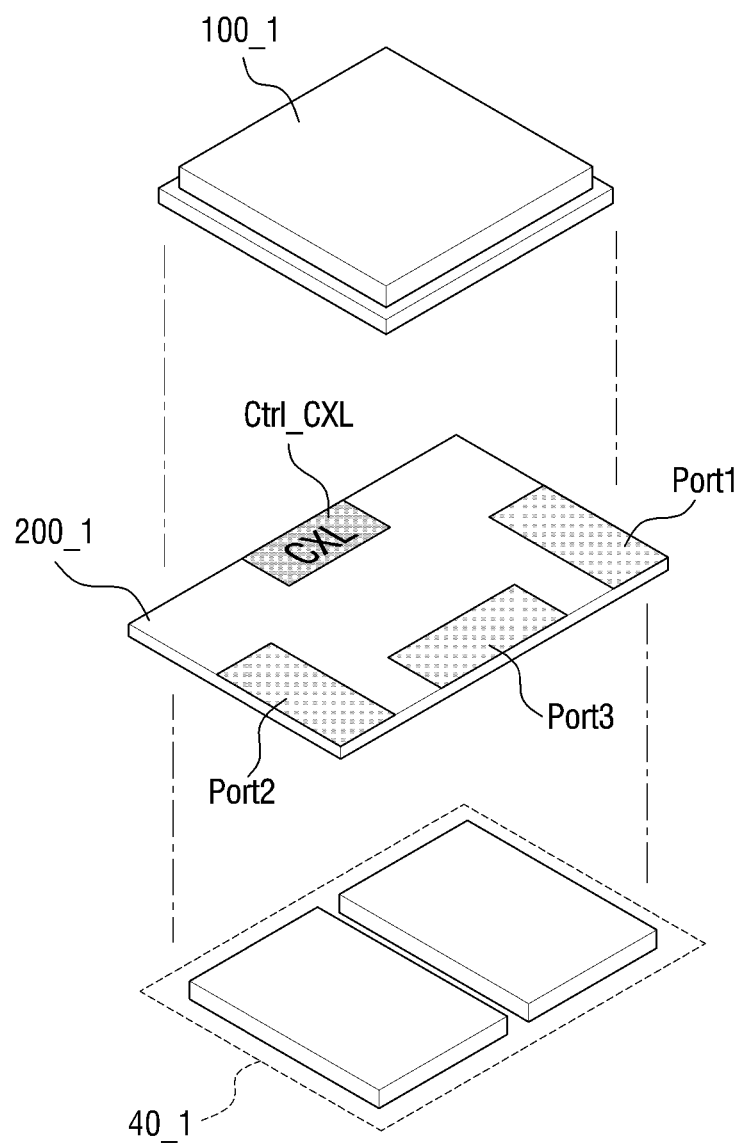
FIG. 6 is a conceptual diagram illustrating in more detail a structure of the first system-on-chip 200_1 of FIG. 5.

FIG. 6 is a conceptual diagram illustrating in more detail a structure of the first system-on-chip 200_1 of FIG. 5.

FIG. 6 illustrates the first system-on-chip 200_1, the first processor 100_1, and the first memory 40_1. The other system-on-chips, the other processors, and the other memory portions have the same or similar structures as the first system-on-chip 200_1, the first processor 100_1, and the first memory 40_1, and thus, redundant descriptions thereof are omitted.

The first system-on-chip 200_1 may include a CXL controller CTRL_CXL, a first port Port1, a second port Port2, and a third port Port3.

The CXL controller CTRL_CXL may be connected to the first processor 100_1 and may serve to forward a memory request from the first processor 100_1 to the shared memory including the first memory 40_1. An operation of the CXL controller CTRL_CXL will be described in more detail below.

The first port Port1, the second port Port2, and the third port Port3 may be physical ports for exchanging data with external devices of the first system-on-chip 200_1. That is, the first system-on-chip 200_1 may exchange data and signals with external devices through the first port Port1, the second port Port2, and the third port Port3. In this case, the external devices may be other system-on-chips or other devices, such as a processor and memory. In this case, the respective ports may connect the system-on-chips to each other in D2D, or connect the system-on-chip to another device in D2D.

FIG. 6 illustrates that the first system-on-chip 200_1 has three ports. However, the embodiment is not limited thereto. That is, the number of ports of the first system-on-chip 200_1 may be 2 or less or 4 or more.

Figure 7:
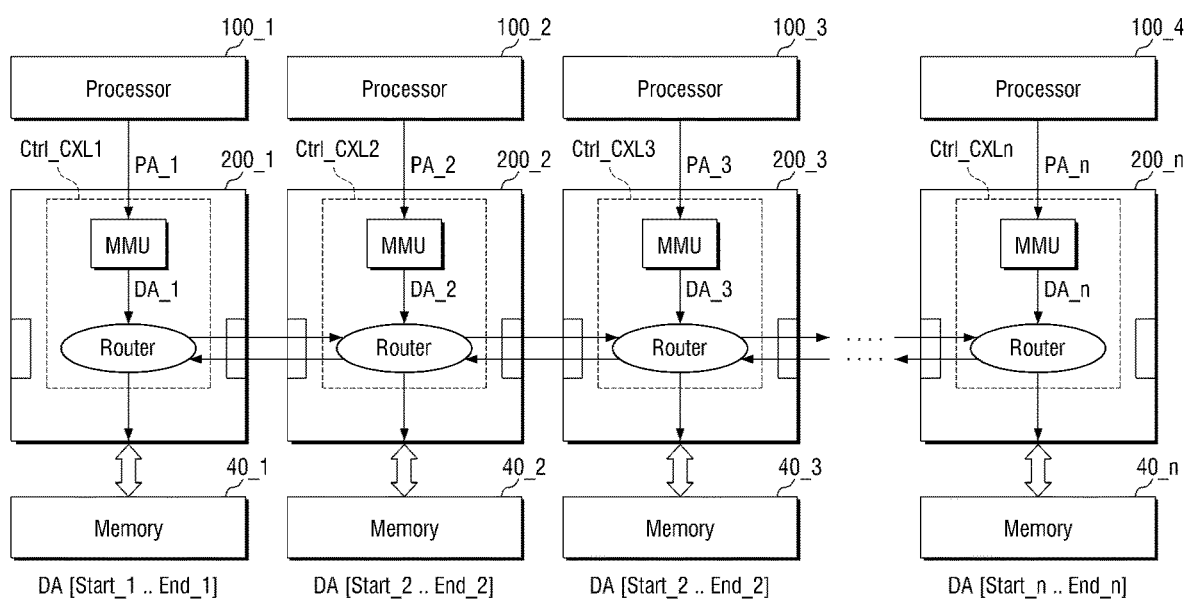
FIG. 7 is a conceptual diagram illustrating a process in which a plurality of system-on-chips forward memory requests to each other.
Figure 8:
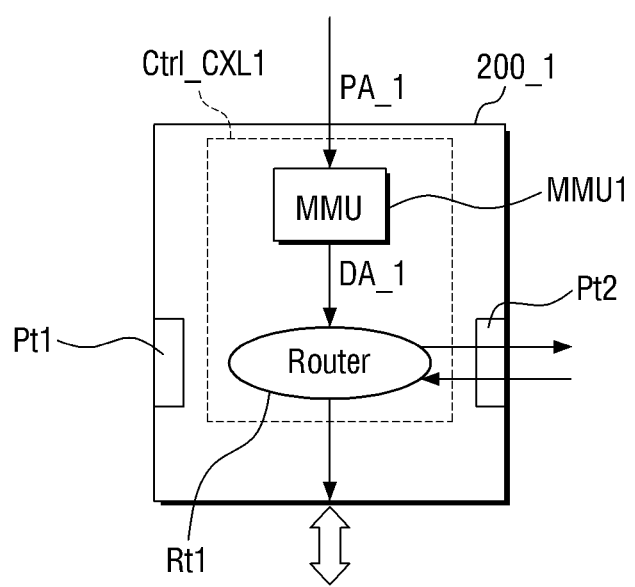
FIG. 8 is a diagram illustrating a structure of the system-on-chip of FIG. 7 in detail.

FIG. 7 is a conceptual diagram illustrating a process in which a plurality of system-on-chips forward memory requests to each other, and FIG. 8 is a diagram illustrating a structure of the system-on-chip of FIG. 7 in detail.

Referring to FIGS. 3, 4, and 7, the first processor 100_1 may generate a first memory request and forward the first memory request to the first system-on-chip 200_1 along with a first physical address PA_1. Similarly, the second processor 100_2 may generate a second memory request and forward the second memory request to the second system-on-chip 200_2 along with a second physical address PA_2, and the third processor 100_3 may generate a third memory request and forward the third memory request to the third system-on-chip 200_3 along with a third physical address PA_3. An n-th processor 100_n may generate an n-th memory request and forward the n-th memory request to the n-th system-on-chip 200_n along with an n-th physical address PA_n.

In this case, the first to n-th memory requests may be requests for storing or loading of the data generated by the first to n-th processors 100_n. Also, the first to n-th physical addresses PA_1 to PA_n may be physical addresses of portions where the first to n-th memory requests have to be processed.

The first to n-th system-on-chips 200_n may respectively include first to n-th CXL controllers CTRL_CXL1 to CTRL_CXLn. The first to n-th CXL controllers (CTRL_CXL) may receive the first to n-th physical addresses (PA_1 to PA_n) from the first to n-th processors 100_n, respectively.

The first to n-th CXL controllers CTRL_CXL1 to CTRL_CXLn may respectively convert the first to n-th physical addresses PA_1 to PA_n into first to n-th device addresses DA_1 to DA_n. In this case, the first to n-th device addresses DA_1 to DA_n may be addresses that facilitate identification of the first to m-th memories 40_1 to 40_m of the shared memory 40. That is, the first to n-th device addresses DA_1 to DA_n may be addresses of a format defined for identification of the first to m-th memories 40_1 to 40_m.

The first CXL controller CTRL_CXL1 of the first system-on-chip 200_1 may forward a first memory request to any one of the first to n-th memories 40_1 to 40_n according to the first device address DA_1. Although FIG. 7 illustrates that the number of processors, system-on-chips, and memories is n, the embodiment is not limited thereto. In particular, there may be m memories different from n memories.

Similarly, the second to n-th CXL controllers CTRL_CXL2 to CTRL_CXLn of the second to n-th system-on-chips 200_2 to 200_n forward the second to n-th memory requests to the second to n-th memories 40_2 to 40_n according to the second to n-th device addresses DA_2 and DA_n.

Referring to FIGS. 7 and 8, the first CXL controller CTRL_CXL1 may include a first MMU MMU1 and a first router Rt1. Because the second CXL controller CTRL_CXL2 to the n-th CXL controller CTRL_CXLn have the same structure as the first CXL controller CTRL_CXL1, descriptions thereof are omitted.

The first MMU MMU1 may receive the first physical address PA_1 from the first processor 100_1 and convert the first physical address PA_1 into the first device address DA_1. The first MMU MMU1 may convert the first physical address PA_1 into the first device address DA_1 by a preset method.

The first router Rt1 may determine whether the first device address DA_1 corresponds to the first memory 40_1. The first router Rt1 may forward a first memory request to the first memory 40_1 when the first device address DA_1 corresponds to the first memory 40_1.

When the first device address DA_1 does not correspond to the first memory 40_1, the first router Rt1 may transfer the first memory request to a system-on-chip other than the first system-on-chip 200_1. In this case, the first router Rt1 may forward the first memory request through a first port pt1 or a second port pt2.

The first port pt1 and the second port pt2 may be respectively connected to external device in the left and right directions of the first system-on-chip 200_1. FIG. 7 does not illustrate a system-on-chip connected to the left side of the first system-on-chip 200_1, and accordingly, the first port pt1 may not be used.

Specifically, the first router Rt1 determines whether the first device address DA_1 is greater than the greatest value End_1 of the device addresses of the first memory 40_1. When the first device address DA_1 is greater than the smallest value Start_1 of the device addresses of the first memory 40_1 and less than the greatest value End_1 of the device addresses of the first memory 40_1, the first router Rt1 may forward a first memory request to the first memory 40_1.

When the first device address DA_1 is greater than the greatest value End_1 of the device addresses of the first memory 40_1, the first router Rt1 may forward the first memory request to a router of the second system-on-chip 200_2 through second port pt2. Similarly, when the first device address DA_1 is greater than the smallest value Start_2 of the device addresses of the second memory 40_2 and less than the greatest value End_2 of the device addresses of the second memory 40_2, the router of the second system-on-chip 200_2 may forward the first memory request to the second memory 40_2.

When the first device address DA_1 is greater than the greatest value End_2 of the device addresses of the second memory 40_2, the first memory request may be forwarded to the second memory 40_2. When the first device address DA_1 is smaller than the smallest value Start_2 of the device addresses of the second memory 40_2, the first memory request may be forwarded to the first memory 40_1. However, this case is a case where the first router Rt1 performs wrong determination, and accordingly, this case may be performed exceptionally.

As in the method described above, the routers of the first to n-th system-on-chips 200_1 to 200_n may forward the first memory request to the device address of a corresponding memory. This may be equally applied to the second to n-th memory requests.

Although FIG. 7 illustrates that a connection structure of each system-on-chip is a ring shape, this is only an example, and the connection structure may be a mesh type or another shape other than the ring shape.

The semiconductor device 1 according to some embodiments of the present disclosure may implement a split sharing function of the shared memory 40 through a chiplet structure instead of the existing CXL switch structure.

A CXL switch may be an interface structure that allows each processor to use different CXL memories. For example, n processors and m shared memories may be freely connected to each other through CXL switches.

However, in the existing CXL switch structure, a processor has to access the shared memory through a CXL switch module, and accordingly, latency of about 450 to 600 ns may occur. This latency exceeding 250 to 300 ns is a very critical weakness in current computing devices and may be a reason why the performance of a device is reduced.

In contrast to this, in the present embodiment, a latency of about 150 to 240 ns may occur through a chiplet structure (a system-on-chip). The latency is only about 40 ns more than the latency of a single processor accessing a single CXL memory. Accordingly, the present embodiment may result in a latency reduction of 300 to 450 ns compared to the existing CXL switch structure.

Hereinafter, a method of forwarding a memory request of a semiconductor device, according to some embodiments of the present disclosure, will be described with reference to FIGS. 9 and 10. Redundant descriptions previously given in the embodiment describe above are simplified or omitted.

Figure 9:
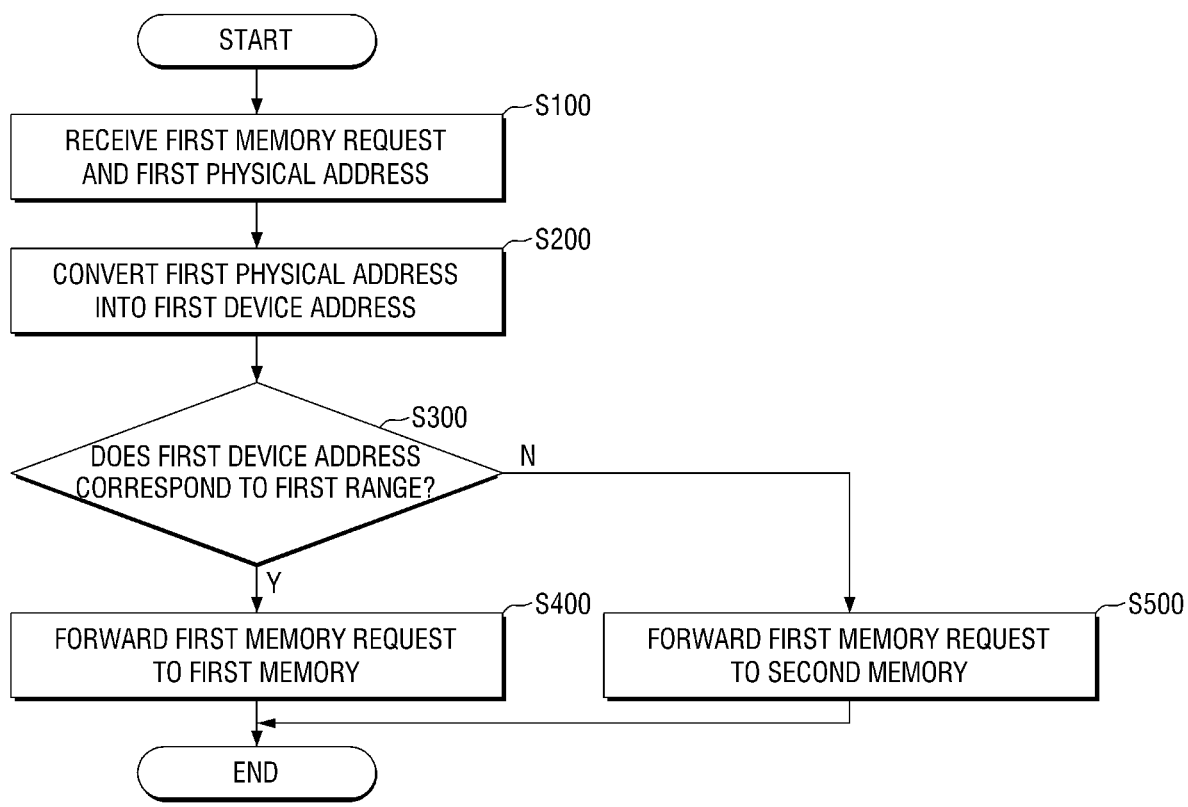
FIG. 9 is a flowchart illustrating a method of forwarding a memory request of a semiconductor device, according to some embodiments of the present disclosure.
Figure 10:
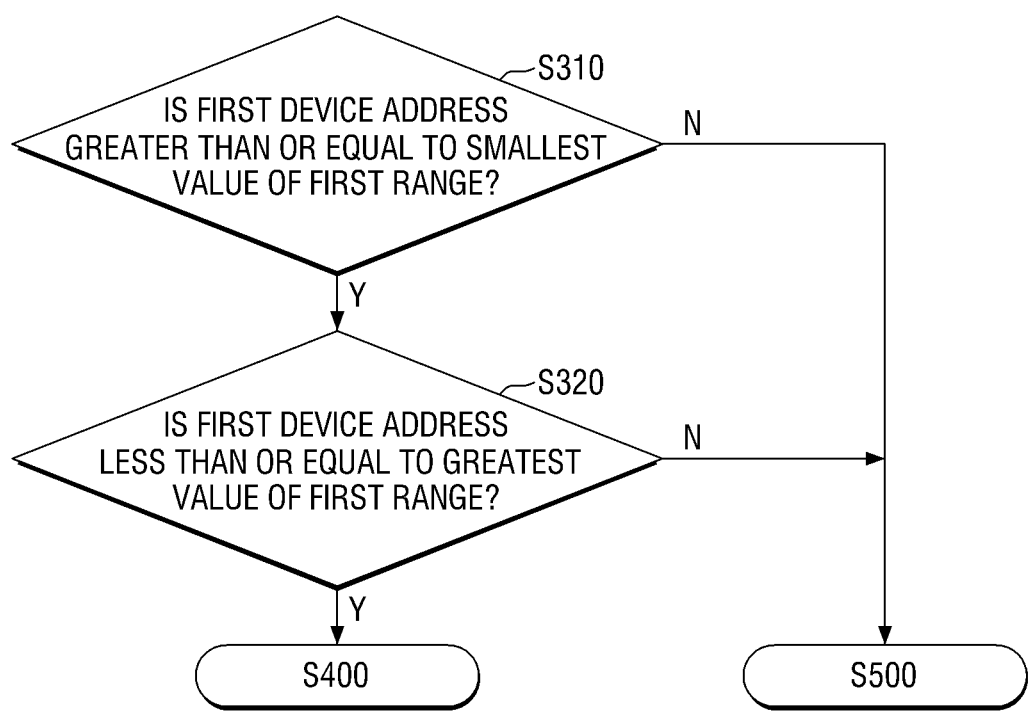
FIG. 10 is a flowchart illustrating in detail a step of determining whether a first device address of FIG. 9 is in a first range.

FIG. 9 is a flowchart illustrating a method of forwarding a memory request of a semiconductor device, according to some embodiments of the present disclosure, and FIG. 10 is a flowchart illustrating in detail a step of determining whether a first device address of FIG. 9 is in a first range.

Referring to FIG. 9, a first memory request and a first physical address are received at S100, and the first physical address is converted into a first device address at S200.

Specifically, referring to FIGS. 7 and 8, the first processor 100_1 may generate the first memory request and forward the first memory request to the first system-on-chip 200_1 along with the first physical address PA_1. The first CXL controller CTRL_CXL1 may convert the first physical address PA_1 into the first device address DA_1. In this case, the first device address DA_1 may be an address that facilitates identification of the first memory 40_1 of the shared memory 40. That is, the first device address DA_1 may be an address of a format defined for identification of the first memory 40_1.

Referring again to FIGS. 9 and 10, it is determined whether the first device address is in the first range at S300. When the first device address is in the first range, the first memory request is forwarded to the first memory at S400. when the first device address is not in the first range, the first memory request is forwarded to the second memory at S500.

In detail, referring to FIG. 10, in step S300, it is determined whether the first device address is greater than or equal to the smallest value of the first range at S310. When the first device address is not greater than or equal to the smallest value of the first range, the process proceeds to step S500. When the first device address is greater than or equal to the smallest value of the first range, it is determined whether the first device address is less than or equal to the greatest value of the first range at S320. When the first device address is not greater than or equal to the smallest value of the first range, the process proceeds to step S500.

When the first device address is less than or equal to the greatest value of the first range, the process proceeds to step S400.

Specifically, referring to FIGS. 7 and 8, it is determined whether the first device address DA_1 corresponds to the first range, that is, a range between the smallest value Start_1 and the greatest value End_1. Specifically, the first router Rt1 determines whether the first device address DA_1 is greater than the greatest value End_1 of the device addresses of the first memory 40_1. When the first device address DA_1 is greater than the smallest value Start_1 of the device addresses of the first memory 40_1 and less than the greatest value End_1 of the device addresses of the first memory 40_1, the first router Rt1 forwards the first memory request to the first memory 40_1.

When the first device address DA_1 is greater than the greatest value End_1 of the device addresses of the first memory 40_1, the first router Rt1 may forward the first memory request to a router of the second system-on-chip 200_2 through second port pt2. Similarly, when the first device address DA_1 is greater than the smallest value Start_2 of the device addresses of the second memory 40_2 and less than the greatest value End_2 of the device address of the second memory 40_2, the router of the second memory 40_2 may forward the first memory request to the second memory 40_2.

When the first device address DA_1 is greater than the greatest value End_2 of the device addresses of the second memory 40_2, the first memory request may be forwarded to the second memory 40_2. When the first device address DA_1 is smaller than the smallest value Start_2 of the device addresses of the second memory 40_2, the first memory request may be forwarded to the first memory 40_1. However, this case is a case where the first router Rt1 performs wrong determination, and accordingly, this case may be performed exceptionally.

As in the method described above, the routers of the first to n-th system-on-chips 200_1 to 200_n may forward the first memory request to the device address of a corresponding memory. This may be equally applied to the second to n-th memory requests.

Hereinafter, a semiconductor device and a method of forwarding a memory request thereof according to some embodiments of the present disclosure will be described with reference to FIGS. 11 to 22. Redundant descriptions previously given in the embodiment describe above are simplified or omitted.

Figure 11:
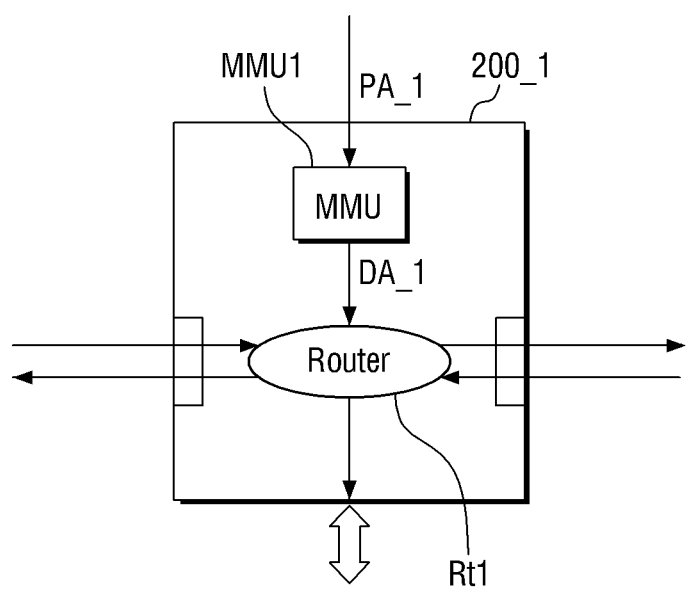
FIG. 11 is a diagram illustrating a first system-on-chip of a semiconductor device according to some embodiments of the present disclosure.
Figure 12:
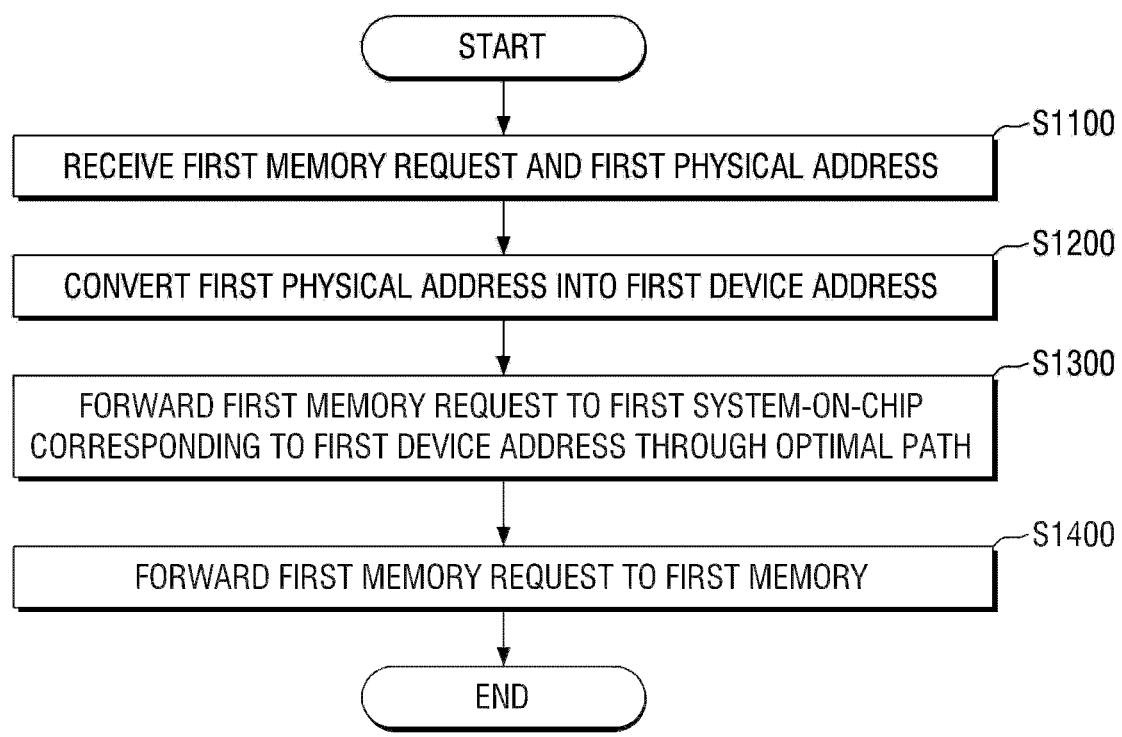
FIG. 12 is a diagram illustrating a method of forwarding a memory request of a semiconductor device according to some embodiments of the present disclosure.

FIG. 11 is a diagram illustrating a first system-on-chip of a semiconductor device according to some embodiments of the present disclosure, and FIG. 12 is a diagram illustrating a method of forwarding a memory request of a semiconductor device according to some embodiments of the present disclosure.

Referring to FIG. 11, a first system-on-chip 200_1 may include a first MMU MMU1 and a first router Rt1. Embodiments of FIGS. 2 to 10 have a structure in which all system-on-chips including the first system-on-chip 200_1 transmit data only in the left and right directions, but the first system-on-chip 200_1 in FIG. 11 may include the first router Rt1 that exchanges data in four directions. However, the present embodiment is not limited thereto. The first system-on-chip 200_1 may exchange data in four or more directions, for example, eight directions.

Referring to FIG. 12, first, a first memory request and a first physical address are received at S1100, and the first physical address is converted into the first device address at S1200. Next, the first memory request is forwarded to the first system-on-chip corresponding to the first device address through an optimal path at S1300.

FIGS. 13 to 22 are intermediate diagrams illustrating a method of forwarding a memory request by the semiconductor device of FIG. 11. Hereinafter, step S1300 of FIG. 12 will be described with reference to FIGS. 13 to 22.

Figure 13:
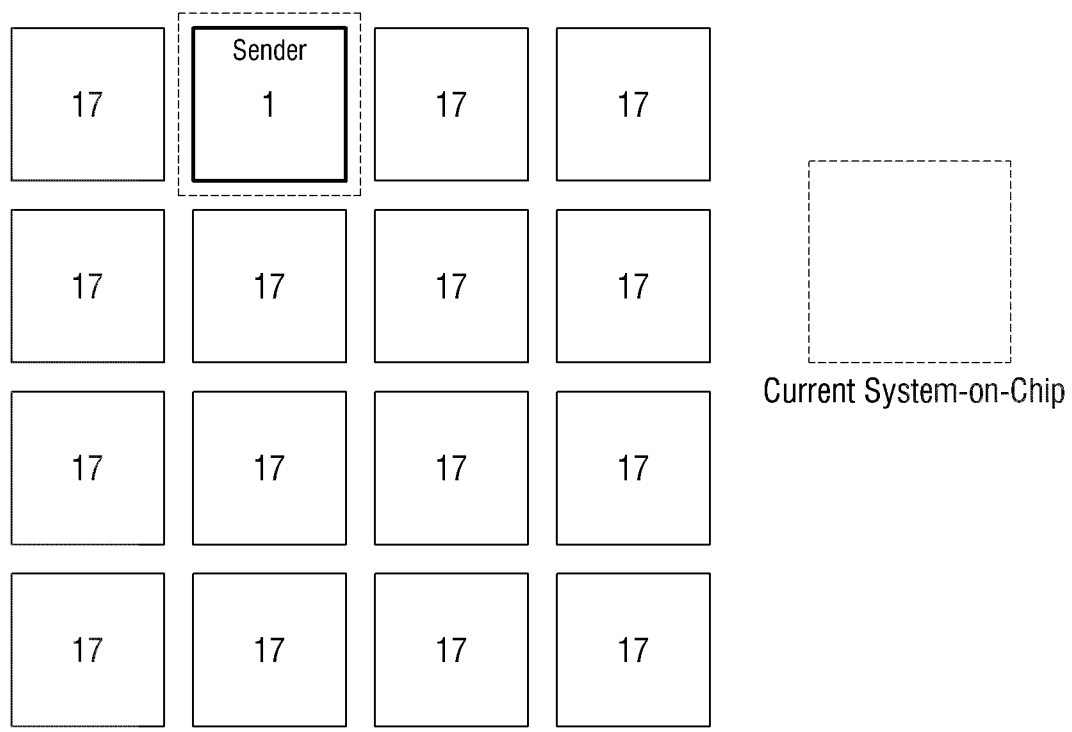
FIGS. 13 to 22 are intermediate diagrams illustrating a method of forwarding a memory request by the semiconductor device of FIG. 11. Hereinafter, step S1300 of FIG. 12 will be described with reference to FIGS. 13 to 22.

FIG. 13 illustrates 16 system-on-chips, such as the first system-on-chip 200_1 of FIG. 11. The 16 system-on-chips may be arranged to form rows and columns. Although FIG. 13 illustrates four rows and four columns, the present embodiment is not limited thereto.

In this case, 16 system-on-chips may correspond to processors on 1:1 basis, receives a memory request forwarded by one processor, derives an optimal path between respective system-on-chips, and forward the memory request.

In FIG. 13, the total number of system-on-chips is 16, and accordingly, a contour number of "17", which is 1 greater than the total number, may be initially assigned to all system-on-chips. A system-on-chip corresponding to the processor forwarding the memory request may be assigned a contour number of "1" as a sender. The "Current system-on-chip" may refer to a system-on-chip that currently has a memory request. The system-on-chip, to which a contour number of "1" is assigned, may first receive a memory request from the processor as a sender.

Figure 14:
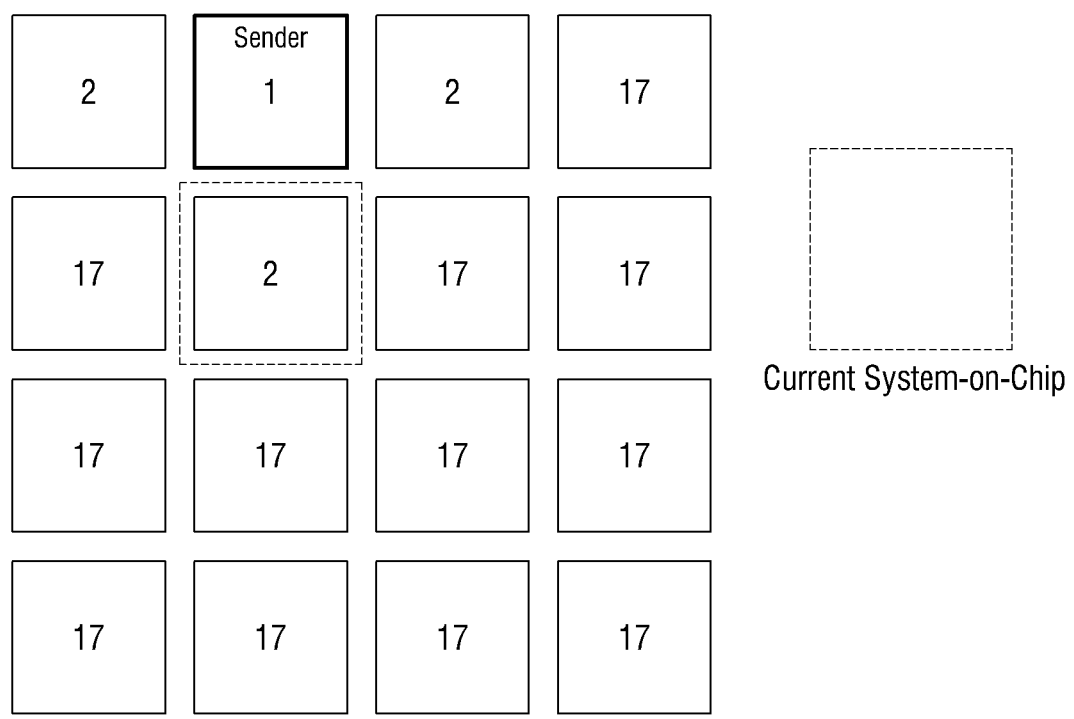

Next, referring to FIG. 14, the contour numbers of system-on-chips adjacent to the "current system-on-chip" may all be changed to "2" which is 1 greater than the contour number of "1" of the "current system-on-chip". In addition, any one of the system-on-chips having a contour number of "2" may be designated as the "current system-on-chip". In this case, when the changed contour number is less than the existing contour number, the contour number may be changed.

In this case, "adjacent" may mean a state directly connected to the "current system-on-chip" through a D2D connection. That is, system-on-chips adjacent to the "current system-on-chip" may be directly connected to the "current system-on-chip" through D2D connection without any other system-on-chips therebetween.

In this case, whether the "current system-on-chip" is a "receiver" having the device address on a memory request is checked, and when the "current system-on-chip" is not the "receiver", a process of changing the "current system-on-chip" is continuously repeated.

Figure 15:
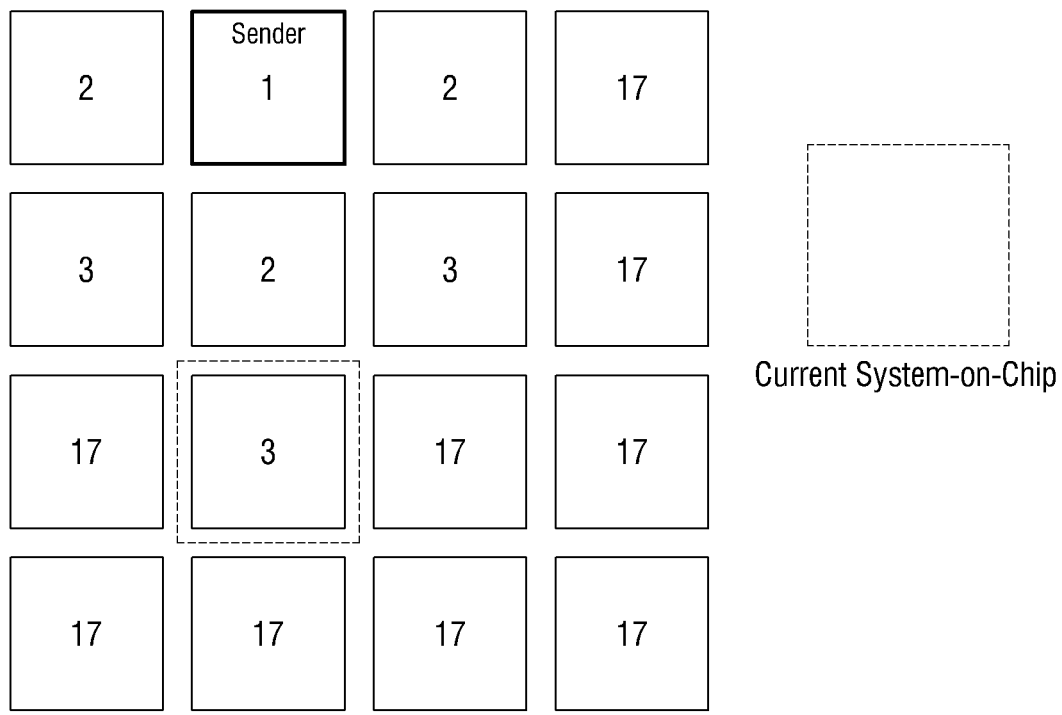

Specifically, referring to FIG. 15, the contour numbers of the system-on-chips adjacent to the "current system-on-chip" may be changed to "3" which is 1 greater than "2" that is the contour number of the "current system-on-chip". Also, any one of the system-on-chips having the contour number of "3" may be designated as the "current system-on-chip". In this case, it is checked that the "current system-on-chip" is not a "receiver".

Figure 16:
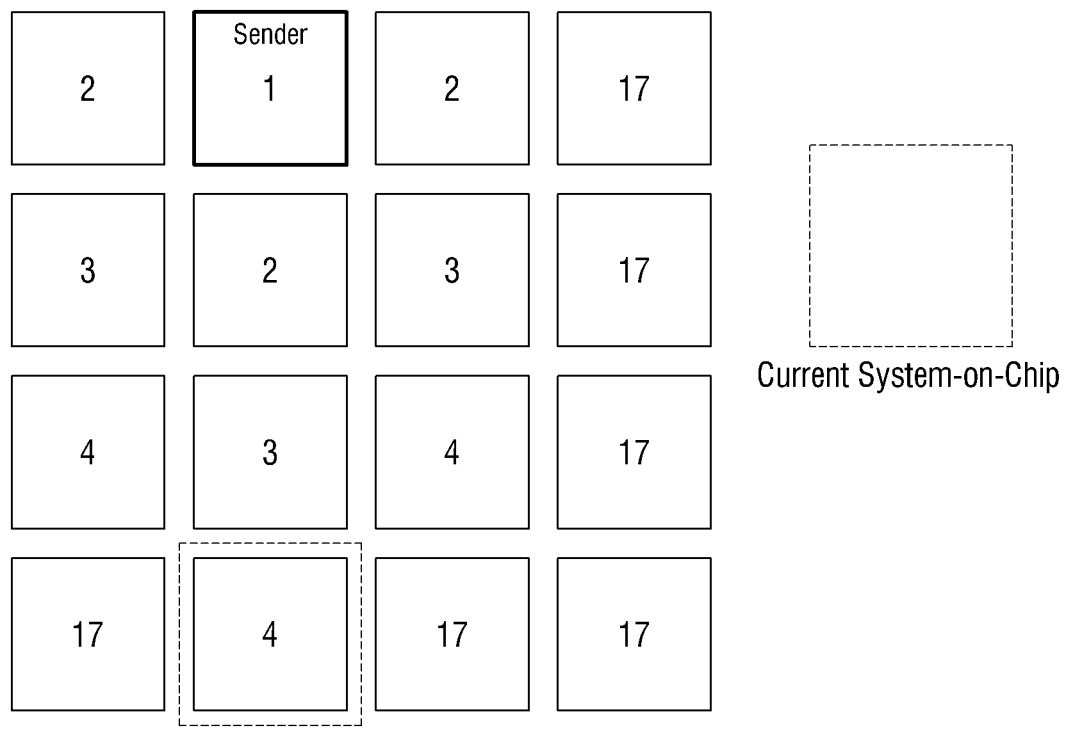

Next, referring to FIG. 16, contour numbers of system-on-chip adjacent to the "current system-on-chip" may be changed to "4" which is 1 greater than "3" that is the contour number of the "current system-on-chip". Also, any one of the system-on-chips having the contour number of "4" may be designated as the "current system-on-chip". In this case, it is checked that the "current system-on-chip" is not a "receiver".

Figure 17:
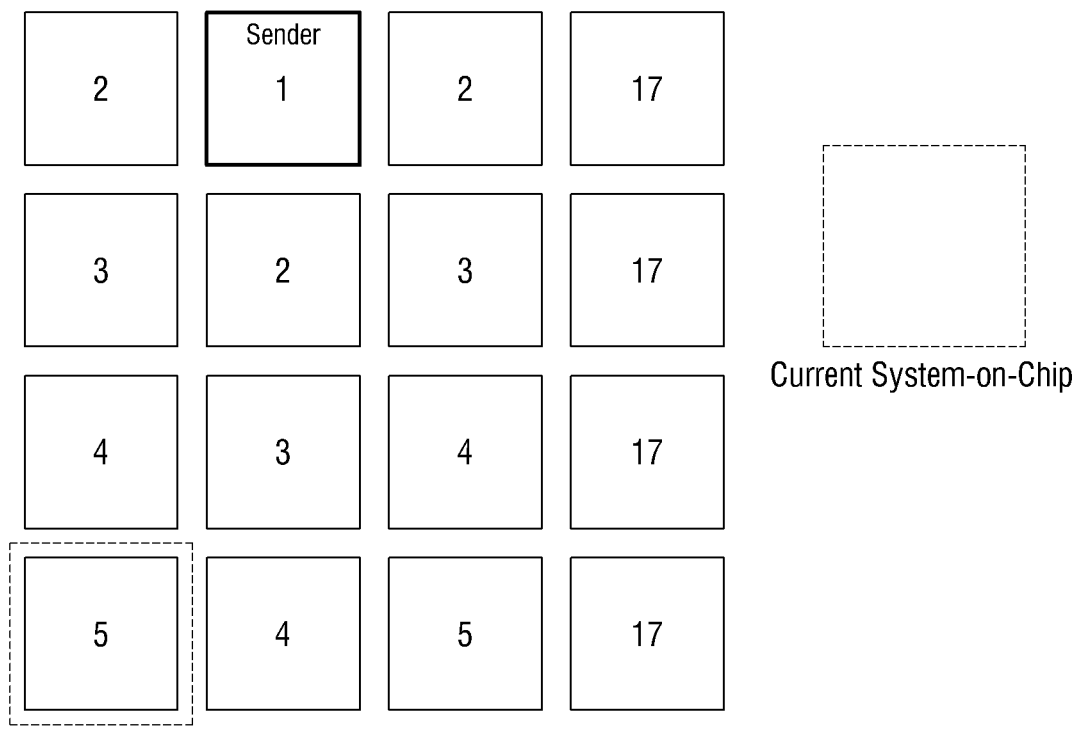

Next, referring to FIG. 17, contour numbers of system-on-chip adjacent to the "current system-on-chip" may be changed to "5" which is 1 greater than "4" that is the contour number of the "current system-on-chip". Also, any one of the system-on-chips having the contour number of "5" may be designated as the "current system-on-chip". In this case, it is checked that the "current system-on-chip" is not a "receiver".

Figure 18:
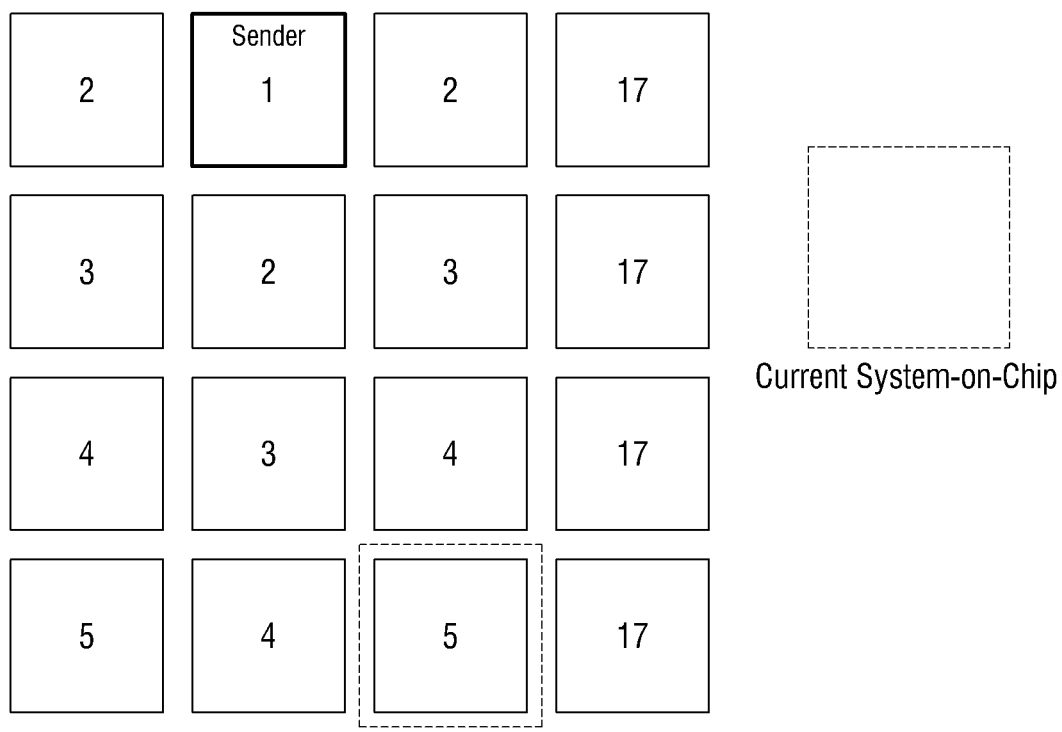

Next, referring to FIG. 18, since all contour numbers of system-on-chip adjacent to the "current system-on-chip" are "4" which is 1 less than "5" that is the contour number of the "current system-on-chip", it is no longer possible to change the contour numbers of adjacent system-on-chips, and accordingly, a system-on-chip having a different contour number of "5" may become the "current system-on-chip". In this case, it is checked that the "current system-on-chip" is not a "receiver".

Figure 19:
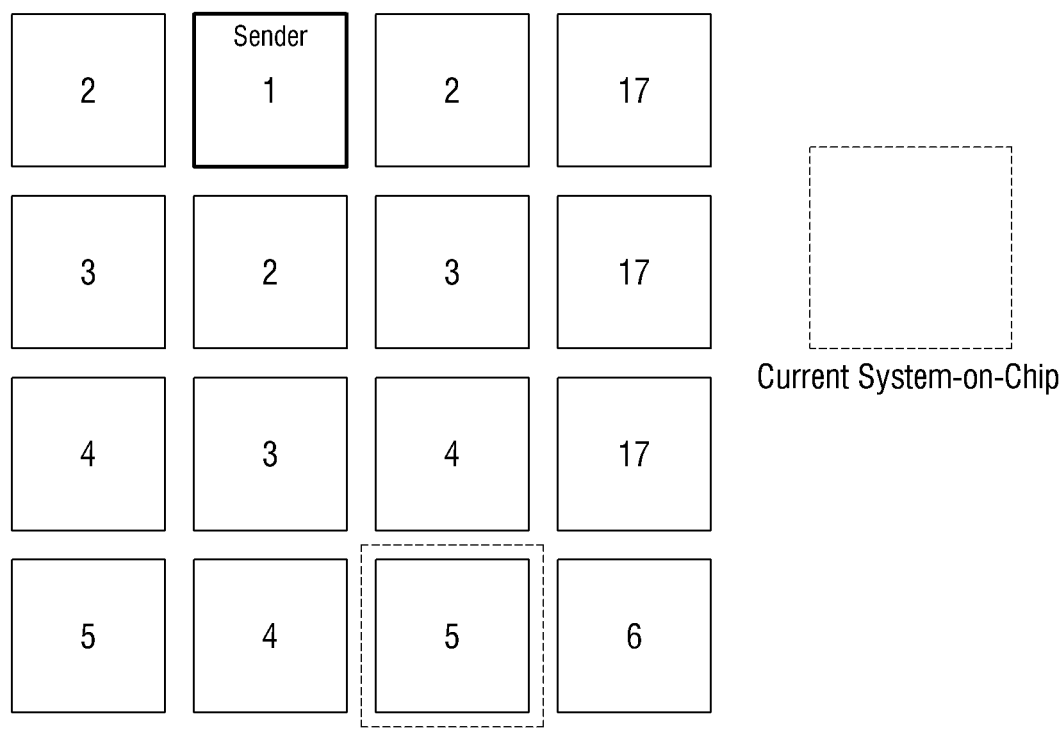
Figure 20:
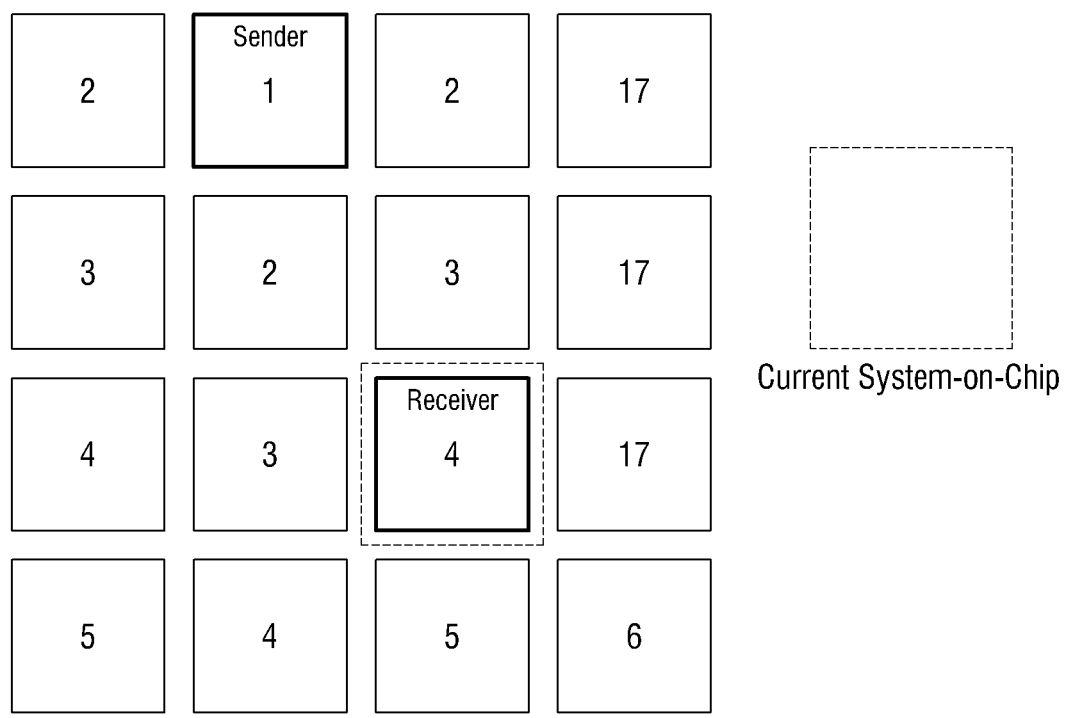

Next, referring to FIG. 19, among system-on-chips adjacent to the "current system-on-chip", the system-on-chips having a contour number greater than the contour number of the "current system-on-chip" may be changed to "6" which is 1 greater than "5" that is the contour number of the "current system-on-chip". Also, the system-on-chip having the contour number of "6" may be designated as the "current system-on-chip". In this case, it is checked that the "current system-on-chip" is not a "receiver".

Next, referring to FIG. 18, since the system-on-chips having a contour number of "5" equal to the contour number of the "current system-on-chip", among system-on-chips adjacent to the "current system-on-chip", is not the "receiver", the system-on-chip that was previously not the "current system-on-chip" among the system-on-chips having the lower contour number of "4" may be designated as the "current system-on-chip". In this case, it is checked that the "current system-on-chip" is not a "receiver".

Figure 21:
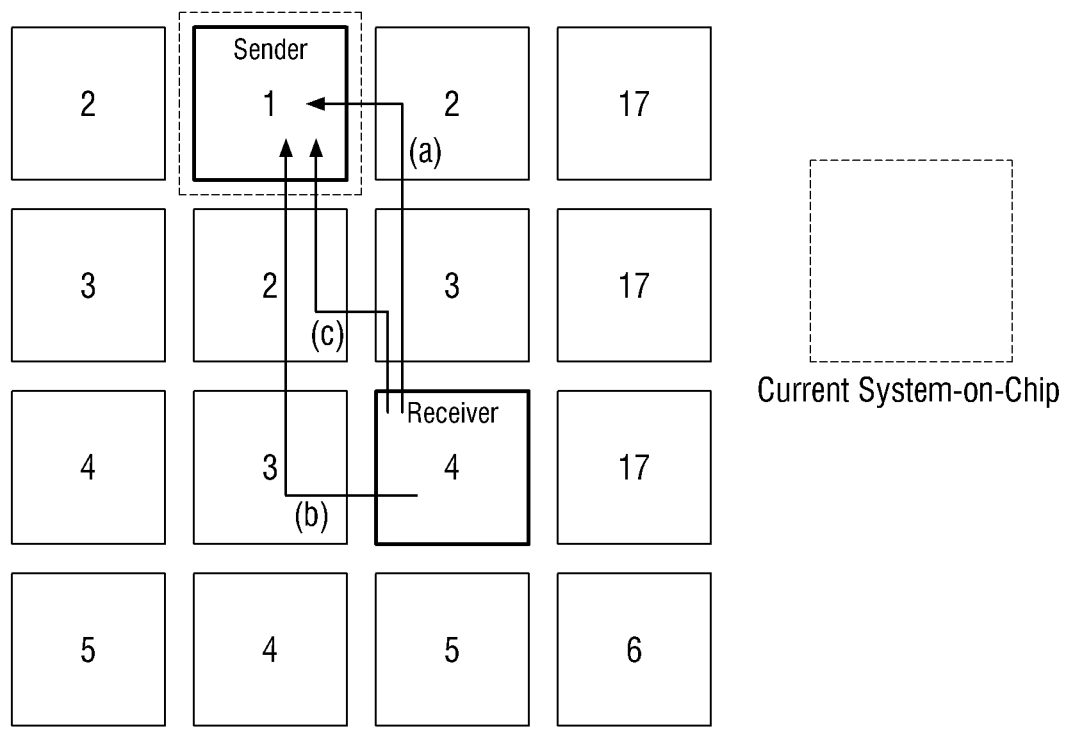

Next, referring to FIG. 21, it is possible to derive an optimal path which passes through the smallest number of system-on-chips between a "sender" and a "receiver" and on which the contour number sequentially increases. In FIG. 21, (a), (b), and (c) may all be optimal paths.

Figure 22:
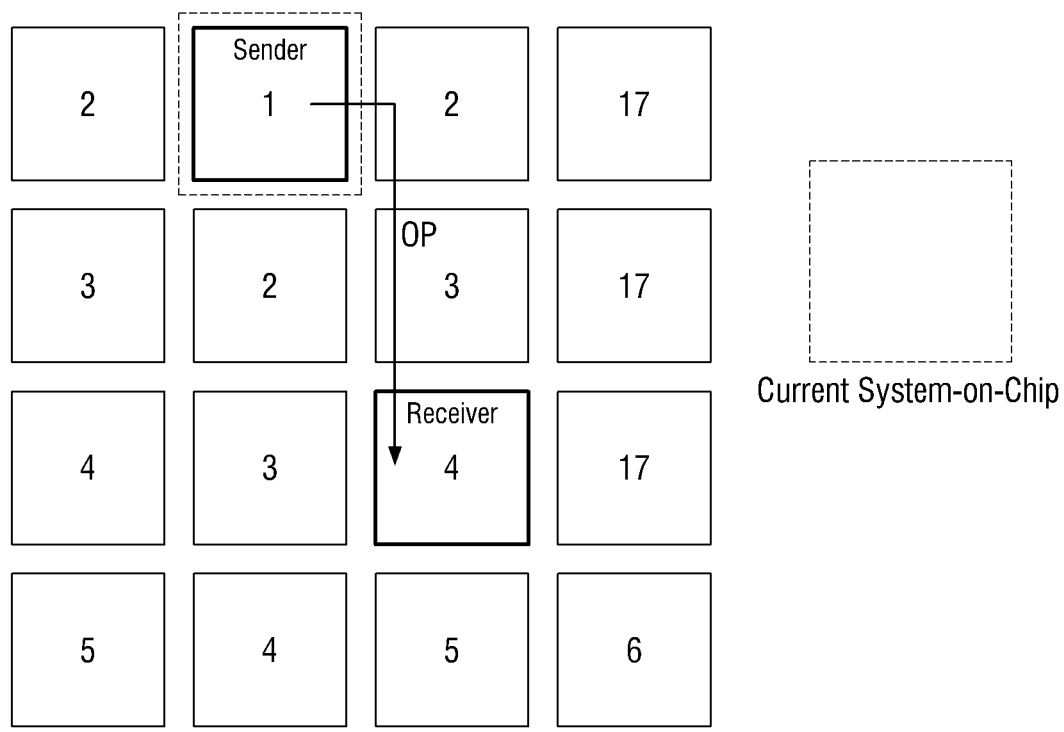

Next, referring to FIG. 22, an optimal path OP may be determined by selecting any one of (a), (b), and (c) of FIG. 21. In FIG. 22, (b) of FIG. 21 may be selected as the optimal path OP.

FIGS. 12 to 21 may be just examples for generating the optimal path OP. That is, the optimal path OP may be generated in other ways.

Referring again to FIG. 12, the first memory request is forwarded to the first memory at S1400. In this case, the first memory may be the "receiver" described with reference to FIGS. 13 to 22. That is, the first memory request may be forwarded to the first memory through the optimal path OP.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A semiconductor device comprising:
a first processor configured to generate a first memory physical address and a first memory request;
a second processor configured to generate a second memory physical address and a second memory request;
a first system-on-chip physically connected to the first processor and configured to convert the first memory physical address into a first device address;

a second system-on-chip physically connected to the second processor and the first system-on-chip and configured to convert the second memory physical address into a second device address; and a first memory and a second memory respectively and physically connected to the first system-on-chip and the second system-on-chip, wherein the first system-on-chip and the second system-on-chip respectively forward the first memory request and the second memory request to one of a plurality of memories including the first memory and the second memory according to the first device address and the second device address.

2. The semiconductor device of claim 1, wherein the first system-on-chip includes:
a first memory management unit (MMU) configured to convert the first memory physical address into the first device address; and
a router configured to determine whether the first device address corresponds to the first memory and configured to forward the first memory request to one of the first memory and the second system-on-chip.

3. The semiconductor device of claim 2, wherein
the first system-on-chip and the second system-on-chip control the plurality of memories according to a compute express link (CXL) protocol.

4. The semiconductor device of claim 2, wherein
the first memory has a device address in a first range,
the second memory has a device address in a second range that is greater than the first range, and
the router compares the first device address with the first range and forwards the first memory request.

5. The semiconductor device of claim 4, wherein
the first range is defined from a start address to an end address, and
the router forwards the first memory request to the second system-on-chip when the first device address is greater than the end address.

6. The semiconductor device of claim 2, further comprising:
a third processor configured to generate a third memory physical address and a third memory request; and
a third system-on-chip physically connected to the third processor, the first system-on-chip, and the second system-on-chip and configured to convert the third memory physical address into a third device address.

7. The semiconductor device of claim 6, wherein
the router forwards the first memory request to an optimal path on which contour numbers are defied in order of proximity to a current system-on-chip.

8. The semiconductor device of claim 1, wherein
the first and second system-on-chip connect through die-to-die interfaces or chip-to-chip interfaces.

9. A method of forwarding a memory request of a semiconductor device, the method comprising:
receiving, by a first processor, a first memory request and a first physical address to which the first memory request has to be forwarded;
converting the first physical address into a first device address by a first system-on-chip physically connected to the first processor;
comparing, by the first system-on-chip, the first device address with a device address of a first memory connected to the first system-on-chip;
forwarding the first memory request to the first memory when the first system-on-chip corresponds to the device address of the first memory;
forwarding the first memory request to a second system-on-chip connected to the first system-on-chip when the first system-on-chip does not correspond to the device address of the first memory;
comparing, by the second system-on-chip, the first device address with a device address of a second memory connected to the second system-on-chip;
forwarding the first memory request to the second memory when the second system-on-chip corresponds to the device address of the second memory; and
forwarding the first memory request to a third system-on-chip connected to the second system-on-chip when the second system-on-chip does not correspond to the device address of the second memory.

10. The method of claim 9, wherein
the device address of the first memory is defined as a first range, and
the comparing of the first device address with the device address of the first memory includes comparing a smallest value of the first range with the first device address, and comparing a greatest value of the first range with the first device address.

11. The method of claim 9, wherein
a path between the first system-on-chip and the third system-on-chip is an optimal path.

* * * * *